US007699656B1

(12) United States Patent
Luo et al.

(10) Patent No.: US 7,699,656 B1
(45) Date of Patent: Apr. 20, 2010

(54) LAMP HOLDER HAVING A WIRE CLAMP

(75) Inventors: Chaowen Luo, Shenzhen (CN); Jifu Zeng, Shenzhen (CN)

(73) Assignee: Civilight Shenzhen Semiconductor Lighting Co., Ltd, Shenzhen (CN)

( * ) Notice: Subject to any disclaimer, the term of this patent is extended or adjusted under 35 U.S.C. 154(b) by 0 days.

(21) Appl. No.: 12/257,250

(22) Filed: Oct. 23, 2008

(30) Foreign Application Priority Data

Jun. 27, 2008 (CN) .................... 2008 2 0095097 U

(51) Int. Cl.
*H02K 1/00* (2006.01)

(52) U.S. Cl. ....................................... 439/611; 362/657

(58) Field of Classification Search ................. 439/485, 439/686, 617, 220, 280, 336, 414, 646, 611; 313/318.05, 318.11; 362/657, 658, 659
See application file for complete search history.

(56) References Cited

U.S. PATENT DOCUMENTS

| | | | | | |
|---|---|---|---|---|---|
| 4,502,103 | A | * | 2/1985 | Collins | 362/249.01 |
| 4,573,754 | A | * | 3/1986 | Hill | 439/280 |
| 4,608,624 | A | * | 8/1986 | Blaisdell et al. | 362/659 |
| 5,003,217 | A | * | 3/1991 | Buschmann | 313/318.05 |
| 5,272,409 | A | * | 12/1993 | Van Dulmen et al. | 313/113 |
| 5,411,407 | A | * | 5/1995 | Thomas | 439/271 |
| 5,465,025 | A | * | 11/1995 | Hendrickson | 313/318.09 |
| 5,791,946 | A | | 8/1998 | Mendez | |
| 6,080,019 | A | * | 6/2000 | Coushaine | 439/611 |
| 7,186,010 | B2 | | 3/2007 | Coushaine et al. | |

* cited by examiner

*Primary Examiner*—Hae Moon Hyeon
(74) *Attorney, Agent, or Firm*—Morris Manning Martin LLP; Tim Tingkang Xia, Esq.

(57) ABSTRACT

A lamp holder for holding a lamp and supplying power into the lamp includes a pair of pins for connecting with a power supply, a pair of electric leads for connecting with the lamp, a wire clamp, and a base for accommodating the wire clamp and securing the pair of pins. The wire clamp comprises an upper wire clamp and a lower wire clamp, a pair of pinholes is defined in the upper wire clamp, and another pair of pinholes is defined in the lower wire clamp, a groove connected with each pinhole for accommodating a tail end of each electric lead is defined in the upper wire clamp, and a through opening corresponding to each groove is defined in the lower wire clamp. When the pair of electric leads passes through the pair of through openings and reaches the pair of grooves, and the pair of pins passes through the pair of pinholes, then each electric lead and each pin are electrically connected.

19 Claims, 6 Drawing Sheets

LAMP HOLDER HAVING A WIRE CLAMP

CROSS-REFERENCE TO RELATED PATENT APPLICATION

This application claims priority to Chinese Patent Application No. 200820095097.9, filed on Jun. 27, 2008, the disclosure of which is incorporated herein in its entirety by reference.

FIELD OF THE INVENTION

The present invention relates generally to electric lamp assembly and more particularly relates to a lamp holder with simple structure and easy assembly process.

BACKGROUND OF THE INVENTION

The conventional lamp holder conventionally includes a pair of pins to connect power supply and a pair of electric leads to connect circuit board and bulb of the lamp. To make the conventional lamp holders, the spot welding machine is applied to joint pins and electric leads. However, the welding portion is easy to fall off and not firm enough, which affects product quality. While the spot welding machine features high cost, high energy consumption and generates hazardous substances, which increase the total cost of the products and contaminate environment against protection.

SUMMARY OF THE INVENTION

It is an objective of the present invention to provide a lamp holder with simple structure, easy assembly process and stable quality. One embodiment of the present invention provides a lamp holder for holding a lamp and supplying power into the lamp, which includes a pair of pins for connecting with a power supply, a pair of electric leads for connecting with the pins and the lamp, a wire clamp for connecting the pair of electric leads and the pair of pins, and a base for accommodating the wire clamp and securing the pair of pins. The base has a bottom portion configured to accommodate the wire clamp. A pair of pin plug holes adapted to be inserted by the pair of pins is defined in the bottom of base. A pair of pin plugs for securing the pair of pins is configured corresponding to the pair of pin plug holes respectively. The wire clamp includes an upper wire clamp and a lower wire clamp, a pair of pinholes corresponding to the pair of pins is defined in the upper wire clamp, and another pair of pinholes corresponding to the pair of pins is defined in the lower wire clamp, a groove for accommodating a tail end of each electric lead is defined from edge of each pinhole and extends to one side wall of the upper wire clamp, and a through opening corresponding to each groove is defined in a side wall of the lower wire clamp. When the pair of electric leads passes through the pair of through openings and reaches the pair of grooves respectively, and the pair of pins passes through the pair of pinholes respectively, then each electric lead and each pin are electrically connected.

In the embodiment a pair of protrusions extends from the upper wire clamp, and a pair of holes corresponding to the pair of protrusions is defined in the lower wire clamp. When each protrusion is engaged into the corresponding hole, the upper wire clamp and the lower wire clamp is assembled together. In the embodiment each electric lead has an L-shape end. The electric lead is made of silica gel wire. The wire clamp and the pin plug are made of insulated and flame retarded materials.

With the special structure of the wire clamp in accordance with the present invention, a user only need to press the upper wire clamp and the lower wire clamp together, and make the pin contact with the electric lead stably, then electrical conducting is achieved. Therefore, it is easy to install. Furthermore, it abandons complicated processes such as welding, sealing and etc, so it greatly increases production efficiency. Additionally, it further realizes stable quality, low production cost, environment protection and green product philosophy.

DETAILED DESCRIPTION OF THE INVENTION

Figure 1:
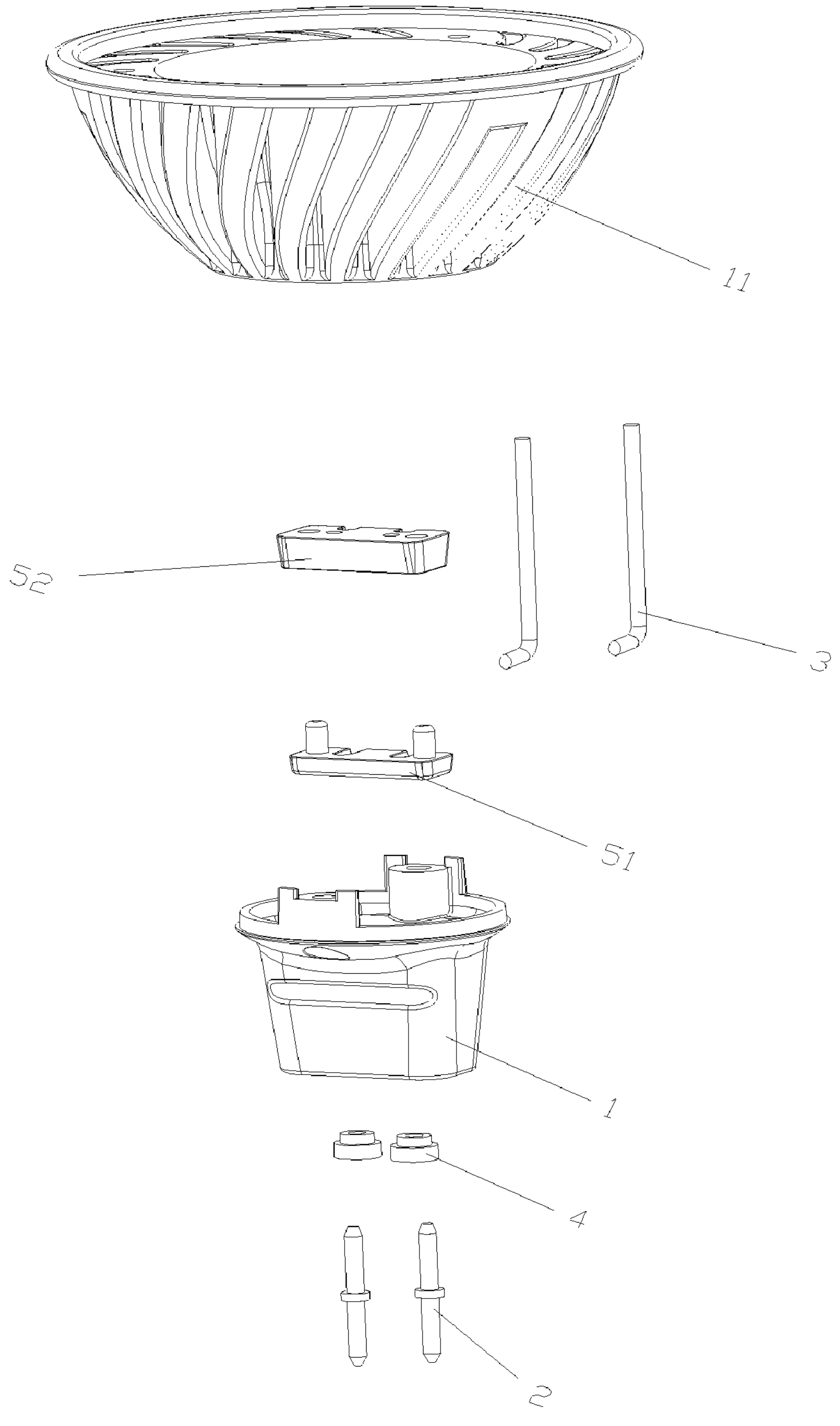
FIG. 1 is an exploded view of a lamp holder in accordance with the present invention with a heat sink in a pre-assembly position, which includes a base, a pair of pins, a wire clamp including a lower wire clamp and an upper wire clamp, and a pair of electric leads.
Figure 2:
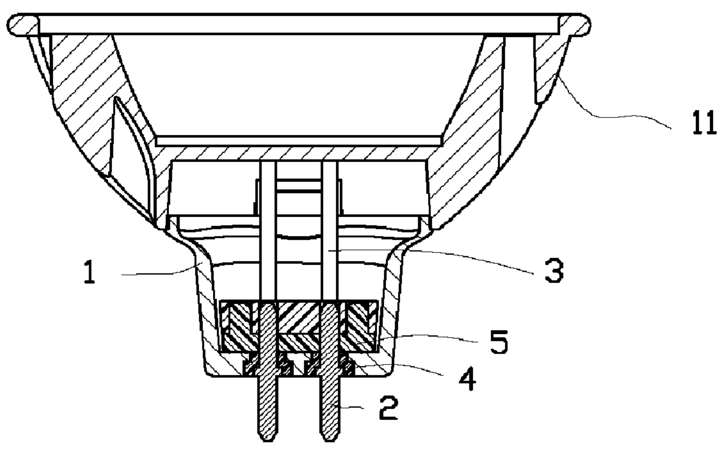
FIG. 2 is a cross-sectional view of the assembled lamp holder with the heat sink in accordance with the present invention.
Figure 3:
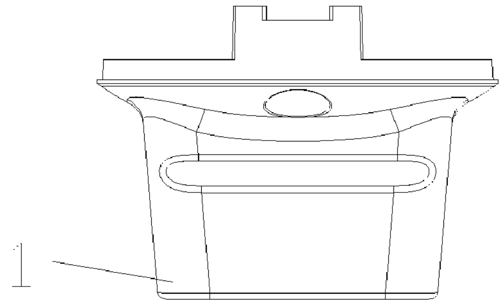
FIG. 3 is a perspective view of the base of the lamp holder in accordance with the present invention.
Figure 4:
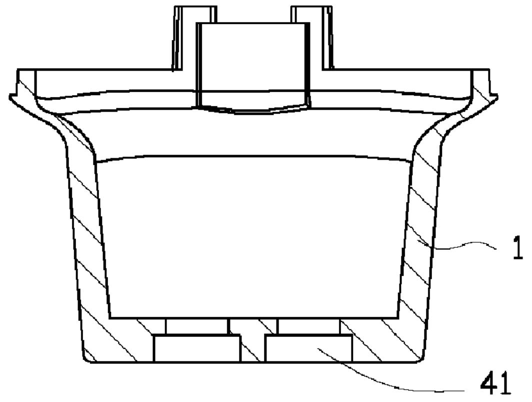
FIG. 4 is a cross-sectional view of the base of the lamp holder in accordance with the present invention.
Figure 5:
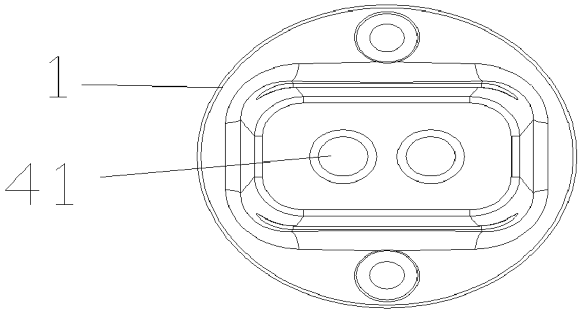
FIG. 5 is a bottom view of the base of the lamp holder in accordance with the present invention.
Figure 6:
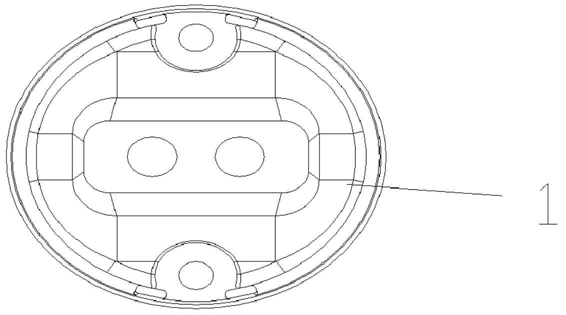
FIG. 6 is a top view of the base of the lamp holder in accordance with the present invention.
Figure 7:
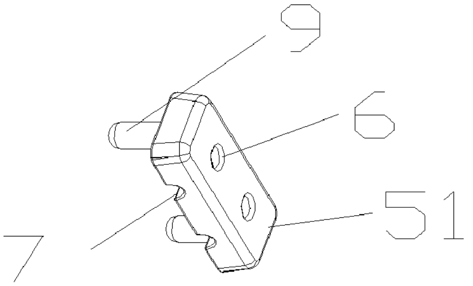
FIG. 7 is a perspective view of the lower wire clamp in accordance with the present invention.
Figure 8:
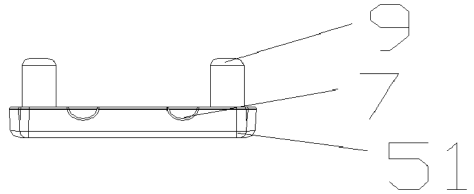
FIG. 8 is a front view of the lower wire clamp in accordance with the present invention.
Figure 9:
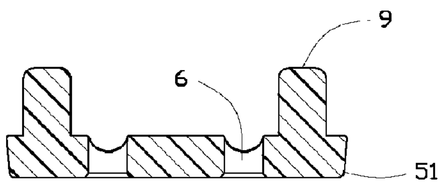
FIG. 9 is a cross-sectional view of the lower wire clamp in accordance with the present invention.
Figure 10:
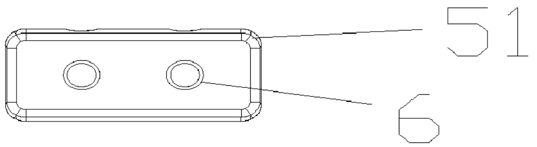
FIG. 10 is a bottom view of the lower wire clamp in accordance with the present invention.
Figure 11:
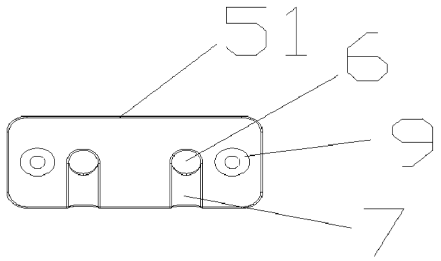
FIG. 11 is a top view of the lower wire clamp in accordance with the present invention.
Figure 12:
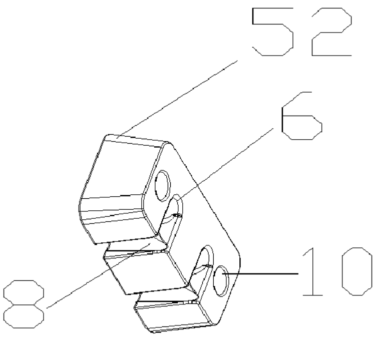
FIG. 12 is a perspective view of the upper wire clamp in accordance with the present invention.
Figure 13:
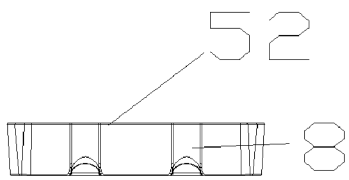
FIG. 13 is a front view of the upper wire clamp in accordance with the present invention.
Figure 14:
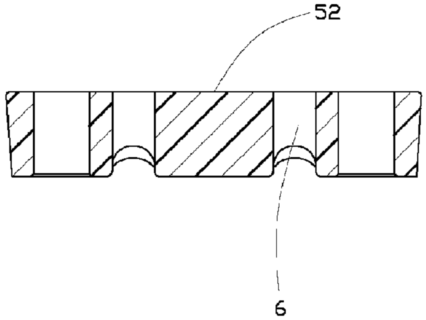
FIG. 14 is a cross-sectional view of the upper wire clamp in accordance with the present invention.
Figure 15:
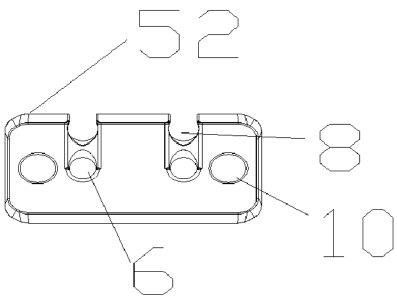
FIG. 15 is a bottom view of the upper wire clamp in accordance with the present invention.
Figure 16:
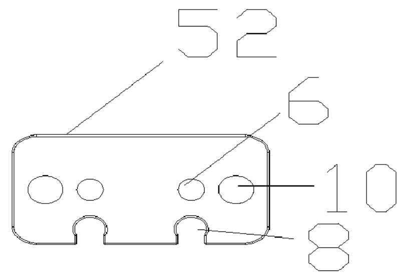
FIG. 16 is a top view of the upper wire clamp in accordance with the present invention.
Figure 17:
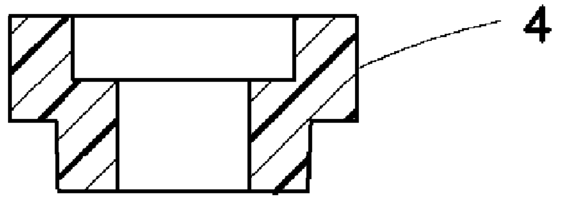
FIG. 17 is a cross-sectional view of the pin in accordance with the present invention.
Figure 18:
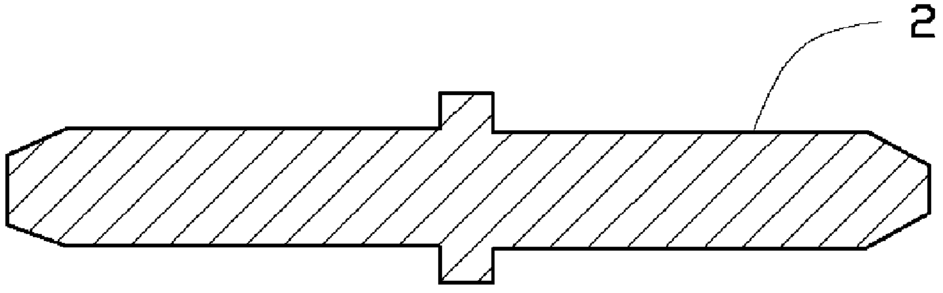
FIG. 18 is a cross-sectional view of a pin plug for the pin in accordance with the present invention.

Referring to FIG. 1 and FIG. 2, a lamp holder in accordance with the present invention comprises a base 1, a pair of pins 2 for connecting with a power supply, a pair of electric leads 3 for connecting with the pair of pins 2 and inputting power to the lamp, A pair of pin plugs 4 adapted to be inserted by the pair of pins 2, and a wire clamp 5 for clamping the pair of electric leads 3. The wire clamp 5 comprises an upper wire clamp 51 and a lower wire clamp 52. As shown in FIG. 2, the lamp holder is assembled with a heat sink 11 to support the heat sink 11. A lamp is mounted in the heat sink 11. Electric power is supplied into the lamp through the lamp holder which is electrically connected with the power supply.

Referring also to FIG. 3 to FIG. 6, the base 1 has a bottom portion configured to accommodate the wire clamp 5. A pair of pin plug holes 41 is defined in the bottom of base 1. A pair of pin plugs 4 is configured corresponding to the pair of pin plug holes 41 respectively. The assembled wire clamp 5 is set on the upper surface of pin plug 4 within base 1.

Referring also to FIG. 7 to FIG. 18, the wire clamp 5 comprises the upper wire clamp 51 and the lower wire clamp 52 that can be mutually fixed. The upper surface of the upper wire clamp 51 is connected with the lower surface of the lower wire clamp 52, and the lower surface of upper wire clamp 51 is connected with the upper surface of the pin plug 4. A pair of pinholes 6 corresponding to the pair of pins 2 is defined in the upper wire clamp 51 of the wire clamp 5, and another pair of pinholes 6 corresponding to the pair of pins 2 is defined in the lower wire clamp 52 with similar shape and size. Each electric lead 3 has an L-shape end. A groove 7 for accommodating a tail end of each electric lead 3 is defined from edge of each pinhole 6 and extends to one side wall of the upper wire clamp 51. The longitudinal section of each groove 7 is at least partially overlapped with the cross section of the pinhole 6. Each groove 7 is perpendicular to a connection line between the two pinholes 6. A through opening 8 connected with the groove 7 is defined in a side wall of the lower wire clamp 52. The cross-sectional areas of the groove 7 and the through opening 8 are not less than the cross-sectional area of the electric lead 3 respectively. When the pair of electric leads 3 passes through the pair of through openings 8 and reaches the pair of grooves 7 respectively, and the pair of pins passes through the pair of pinholes 6 respectively, then each electric lead 3 and each pin 2 are electrically connected.

A pair of protrusions 9 extends from the upper wire clamp 51. A pair of holes 10 corresponding to the pair of protrusions 9 is defined in the lower wire clamp 52. Each protrusion 9 is engaged into the corresponding hole 10 so that the upper wire clamp 51 and the lower wire clamp 52 is assembled together.

The electric lead 3 is made of silica gel wire. The wire clamp 5 and the pin plug 4 are made of insulated and flame retarded materials.

Insert the pin plug 4 into the pin plug hole 41 in the base 1. Press the upper wire clamp 51 and lower wire clamp 52 together to form wire clamp 5. Put the electric lead 3 into the through opening 8 of the lower wire clamp 52, connect one unbended end with the lamp and insert the bended end into the groove 7 in the upper wire clamp 51. Put the assembled wire clamp 5 with the electric leads 3 into the base 1. Insert one end of the pin 2 into the pin plug 4 and through the pinholes 6 in the wire clamp 5, and connect the other end of the pin 2 with the external power supply. Thus the electric lead 3 is connected with the pin 2 to realize current conduction. The heat sink 11 is installed on base 1.

With the special structure of the wire clamp in accordance with the present invention, a user only need to press the upper wire clamp and the lower wire clamp together, and make the pin contact with the electric lead stably, then electrical conducting is achieved. Therefore, it is easy to install. Furthermore, it abandons complicated processes such as welding, sealing and etc, so it greatly increases production efficiency. Additionally, it further realizes stable quality, low production cost, environment protection and green product philosophy.

What is claimed is:

1. A lamp holder for holding a lamp and supplying power into the lamp comprising:

a pair of pins for connecting with a power supply, a pair of electric leads for connecting with the pins and the lamp, a wire clamp for connecting the pair of electric leads and the pair of pins, the wire clamp comprising an upper wire clamp and a lower wire clamp, the upper wire clamp defining a pair of pinholes corresponding to the pair of pins; and a base for accommodating the wire clamp and securing the pair of pins.

2. The lamp holder as claimed in claim 1, wherein the base has a bottom portion configured to accommodate the wire clamp.

3. The lamp holder as claimed in claim 1, wherein a pair of pin plug holes adapted to be inserted by the pair of pins is defined in the bottom of the base respectively.

4. The lamp holder as claimed in claim 3, wherein a pair of pin plugs for securing the pair of pins is configured corresponding to the pair of pin plug holes respectively.

5. The lamp holder as claimed in claim 1, wherein another pair of pinholes corresponding to the pair of pins is defined in the lower wire clamp; a groove for accommodating a tail end of each electric lead is defined from edge of each pinhole and extends to one side wall of the upper wire clamp, and a through opening corresponding to each groove is defined in a side wall of the lower wire clamp, wherein the pair of electric leads passes through the pair of through openings and reaches the pair of grooves respectively.

6. The lamp holder as claimed in claim 5, wherein a pair of protrusions extends from the upper wire clamp, and a pair of holes corresponding to the pair of protrusions is defined in the lower wire clamp, wherein when each protrusion is engaged into the corresponding hole, the upper wire clamp and the lower wire clamp is assembled together.

7. The lamp holder as claimed in claim 1, wherein each electric lead has an L-shape end.

8. The lamp holder as claimed in claim 1, wherein each electric lead is made of silica gel wire.

9. The lamp holder as claimed in claim 4, wherein the wire clamp and the pin plug are made of insulated and flame retarded materials.

10. The lamp holder as claimed in claim 1, wherein another pair of pinholes corresponding to the pair of pins is defined in the lower wire clamp, a pair of grooves for accommodating tail ends of the pair of electric leads is defined in the upper wire clamp, and a pair of through openings connected with the pair of grooves is defined in the lower wire clamp, the longitudinal section of each groove is at least partially overlapped with the cross section of the corresponding pinhole.

11. A lamp holder for holding a lamp and supplying power into the lamp comprising:

a pair of pins for connecting with a power supply, a pair of electric leads for connecting with the pins and the lamp, a wire clamp for connecting the pair of electric leads and the pair of pins, and a base for accommodating the wire clamp and securing the pair of pins, wherein at least one pair of pinholes corresponding to the pair of pins is defined in the wire clamp, a pair of grooves connected with the at least one pair of pinholes for accommodating tail ends of the pair of electric leads is defined in the wire clamp, and a pair of through openings connected with the pair of grooves is defined in the wire clamp.

12. The lamp holder as claimed in claim 11, wherein the base has a bottom portion configured to accommodate the wire clamp.

13. The lamp holder as claimed in claim 11, wherein a pair of pin plug holes adapted to be inserted by the pair of pins is defined in the bottom of the base respectively.

14. The lamp holder as claimed in claim 13, wherein a pair of pin plugs for securing the pair of pins is configured corresponding to the pair of pin plug holes respectively.

15. The lamp holder as claimed in claim 11, wherein the wire clamp comprises an upper wire clamp and a lower wire clamp, one of the at least one pair of pinholes is defined in the upper wire clamp, and another pair of pinholes is defined in the lower wire clamp, the pair of grooves is defined in the upper wire clamp, and the pair of through openings is defined in the lower wire clamp.

16. The lamp holder as claimed in claim 15, wherein a pair of protrusions extends from the upper wire clamp, and a pair of holes corresponding to the pair of protrusions is defined in the lower wire clamp, wherein when each protrusion is engaged into the corresponding hole, the upper wire clamp and the lower wire clamp is assembled together.

17. The lamp holder as claimed in claim 11, wherein each electric lead has an L-shape end.

18. The lamp holder as claimed in claim 11, wherein each electric lead is made of silica gel wire.

19. The lamp holder as claimed in claim 14, wherein the wire clamp and the pin plug are made of insulated and flame retarded materials.

* * * * *